(12) United States Patent
Couvertier, II (10) Patent No.: US 10,195,674 B1
(45) Date of Patent: Feb. 5, 2019

(54) JIG ASSEMBLY (71) Applicant: Douglas Couvertier, II, Weston, FL (US)

(72) Inventor: Douglas Couvertier, II, Weston, FL (US)

( * ) Notice: Subject to any disclaimer, the term of this patent is extended or adjusted under 35 U.S.C. 154(b) by 28 days.

(21) Appl. No.: 15/594,157

(22) Filed: May 12, 2017

(51) Int. Cl.
- *B23B 49/02* (2006.01)
- *E05D 11/00* (2006.01)
- *B23B 47/28* (2006.01)

(52) U.S. Cl.
CPC .......... *B23B 49/02* (2013.01); *E05D 11/0009* (2013.01); *B23B 47/287* (2013.01); *B23B 2247/06* (2013.01); *B23B 2247/12* (2013.01)

(58) Field of Classification Search
CPC ... Y10T 408/567; B23B 47/28; B23B 47/287; B23B 49/02; B23B 2247/06; B23B 2247/12

See application file for complete search history.

(56) References Cited

U.S. PATENT DOCUMENTS

| | | | | |
|---|---|---|---|---|
| 2,351,243 A | * | 6/1944 | Vetter | B23B 47/28 29/271 |
| 2,430,025 A | * | 11/1947 | Mattias | B23B 47/28 408/241 G |
| 2,644,348 A | * | 7/1953 | Castle | B23B 47/28 408/110 |
| 3,241,453 A | * | 3/1966 | Baldwin | B23C 3/126 144/126 |
| 3,914,871 A | * | 10/1975 | Wolff | B23B 47/288 269/41 |
| 4,158,955 A | * | 6/1979 | Bustin | B21D 22/04 72/414 |
| 4,445,264 A | * | 5/1984 | Banerian | B21D 22/04 29/445 |
| 4,601,618 A | * | 7/1986 | McEldowney | B23B 47/28 408/1 R |
| 4,715,125 A | | 12/1987 | Livick | |
| 4,896,663 A | | 1/1990 | Vandewalls | |
| 5,076,742 A | * | 12/1991 | Lee | B23B 47/287 408/112 |
| 5,222,845 A | | 6/1993 | Goldstein et al. | |
| 6,254,320 B1 | | 7/2001 | Weinstein et al. | |
| 6,468,007 B2 | | 10/2002 | Coleiro | |
| 6,604,744 B2 | | 8/2003 | Monge | |
| 7,112,014 B2 | | 9/2006 | Thomas | |

(Continued)

*Primary Examiner* — Daniel Howell
*Assistant Examiner* — Yasir Diab
(74) *Attorney, Agent, or Firm* — Albert Bordas, P.A.

(57) ABSTRACT

A jig assembly structured to facilitate attachment of a device to a door including a base having oppositely disposed first and second end segments and an open interior, including first and second open faces. The open interior and the open faces are disposed between the end segments and are cooperatively structured therewith to receive a portion of the door in an operative position therein. A clamp member is movably connected to the first end segment and is least partially disposable into said open interior in clamping relation to the door portion, when in the operative portion. The second end segment is disposed and structured to receive passage therethrough of a tool, from an exterior to and interior of the base, into engaging relation with the door portion disposed in the operative position and into an interior channel of the clamp member.

21 Claims, 3 Drawing Sheets

(56) References Cited

U.S. PATENT DOCUMENTS

| | | |
|---|---|---|
| 7,699,847 B2 | 4/2010 | Sheldon et al. |
| 2004/0141822 A1 | 7/2004 | Hiller |
| 2005/0220549 A1* | 10/2005 | Thomas ................ B23B 47/287 |
| | | 408/115 R |
| 2006/0285931 A1* | 12/2006 | Dean .................... B23B 47/287 |
| | | 408/103 |
| 2007/0009335 A1 | 1/2007 | Brewington |
| 2010/0098507 A1* | 4/2010 | Binmore ................ B23B 47/28 |
| | | 408/1 R |
| 2010/0296885 A1* | 11/2010 | Chen ................... B25H 1/0057 |
| | | 408/99 |
| 2011/0255928 A1 | 10/2011 | Ferreras |
| 2014/0366395 A1* | 12/2014 | Ward ..................... E05B 17/06 |
| | | 33/613 |

* cited by examiner

JIG ASSEMBLY

BACKGROUND OF THE INVENTION

Field of the Invention

The present invention is directed to a jig assembly operatively structured to accurately mount or connect a device such as, but not limited to, a doorstop device to a door. The jig assembly includes a base having an open interior dimensioned and configured to removably maintain, through clamping, a portion of the door in an operative position, wherein a tool passes through the jig assembly into a portion of the door on which the device is intended to be mounted.

Description of the Related Art

The use of fixtures, guides, templates, jigs, etc. for the accurate connection or mounting of various types of hardware or other devices on various types of doors is extremely well known. Many of such fixtures, guides, etc. have a generally customized structure and/or configuration in order to adapt to the door or other structure on which the hardware/device is to be mounted. In more basic terms, such fixtures are used to accurately position a tool relative to the location on the door or structure at which the hardware/device is to be connected.

As is also well known, different types of tools may be used to penetrate or otherwise modify the door/structure in a manner which facilitates the connection thereto of the various hardware/device. Accordingly, the dimension, configuration and overall structure of a fixture, jig, template, etc. may vary, dependent on the tool being used, physical properties of the door or structure to which the hardware or other device is to be attached.

Therefore, it is well known to carpenters, handymen, homeowners, etc. that the installation and finishing of various types of doors, including entry doors, cabinet doors, furniture doors, etc. is not only difficult but time-consuming. Such difficulty, is due in part to the accurate location/connection of various devices, including the aforementioned hardware, to the different types of doors. Even when known or commercially available fixtures, jigs, templates, etc. are available, repeated measurements and adjustments are frequently necessary.

By way of example only, it is commonplace to use specialized or customized guides, fixtures, jigs, templates, etc. for the mounting or attachment of different handles, lock mechanisms, hinges, etc. Therefore, while known fixtures of the type generally set forth herein may be considered to be operative for their intended function, many such fixtures still require precise positioning, repeated measurements and other time-consuming activities by an installer in order to achieve the accurate placement of such hardware/devices.

Additional and related problems or disadvantages associated with known fixtures of the type referred to herein include the accurate and sometimes precise location of a required tool such as, but not limited to, a drill and/or drill bit. Also, hardware type devices other than hinges, handles, door locks, etc. are also frequently required or desired on the different types of doors depending on their use and practical application. By way of example, doorstops, while commonplace frequently require a mounting or connection to a given door structure in a substantially precise location. Without such accurate positioning, damage may be done to the door or related wall or floor surfaces engaged by the doorstop.

Therefore, there is a need in this area for a jig or fixture assembly which efficiently accomplishes the connecting or mounting of a device such as, but not limited to, a doorstop accurately in an intended location on a portion of the door. In more specific terms and further by way of example, a doorstop may preferably be located in a lower, outer portion of a door in adjacent, but more commonly in spaced relation to a corner segment of the portion of the door. Such a preferred and improved jig assembly operative to efficiently accomplish this purpose should be dimensioned, configured and include an overall structure which facilitates a quick, easy and accurate positioning of the door portion and/or corner segment thereof in an operative on or within the improved fixture and/or jig assembly. Further, such an improved jig assembly should also be structured for the accurate placement of a tool into modifying engagement with the intended portion of the door on which the device, doorstop, or other hardware is to be mounted.

SUMMARY OF THE INVENTION

The present invention is directed to a jig assembly structured to facilitate the accurate attachment or mounting of a device including, but not limited to, a doorstop to a door. In more specific terms, the jig assembly is structured to be used in combination with a tool operable to penetrate and form a connection hole, or other connecting structure, within a predetermined portion of the door at which the device or doorstop will be connected. In addition, the operable tool may be in the form of a drill or more specifically a drill bit, which will be movable relative to portions of the jig assembly in a manner which facilitates the tool/drill bit being accurately positioned to engage and penetrate the intended portion of the door.

Accordingly, at least one preferred embodiment of the jig assembly includes a base having an open interior disposed between and in structurally cooperative relation with two spaced apart, substantially opposite end segments. Further, the end segments are fixedly interconnected to one another by at least one or a plurality of spaced apart side or arm segments. The spacing between the two end segments is sufficient to accommodate doors of various sizes being placed between the two end segments and within the open interior in an "operative position". As set forth in greater detail hereinafter, the operative position of the door is at least generally defined by a receipt and retention of the door portion within the open interior, in an intended, predetermined orientation. As such, the operative position of the door portion, within the open interior, facilitates the accurate positioning of the tool/drill bit relative to the door portion, which in turn facilitates the accurate attachment of the device/doorstop in the intended location on the door portion.

Therefore, due to the enlarged dimension and configuration of the open interior, as well as the end segments defining corresponding boundaries thereof, the jig assembly of the present invention also includes a clamp member. The clamp member has an elongated configuration movably connected to a first of the two opposing end segments. An intended manipulation of the clamp member results in it being forced into clamping relation to the door or door portion disposed in the operative position within the open interior. Accordingly, the clamp member includes an exterior threaded surface extending along a majority, an entirety or a predetermined portion of the length thereof. The exterior threaded surface of the clamp member is disposed in movable, mating, threaded engagement with a threaded interior surface of at least one hole or opening formed in the first end segment.

Moreover, the clamp member is disposed both exteriorly of the base and interiorly of the open interior thereof. Manual manipulation, such as rotation, of the clamp member is accomplished by a knob, grip, handle, etc. formed on an outer free end of the clamp member. The knob or grip is configured to facilitate gripping and forced rotation of the clamp member. Such rotation, due to the aforementioned threaded connection, will force the free, inner end of the clamp member into clamping relation with the portion of the door which is disposed in the operative position within the open interior. Such clamping relation will in turn force an opposite surface of the door portion into a secured, clamped engagement with the correspondingly disposed inner surface of the second of the opposing end segments.

As indicated, accurate, intended connection of the device/doorstop to a predetermined portion of the door is at least partially dependent upon accurate placement of the tool and/or drill bit, relative to the door. Accordingly, the clamp member includes an interior channel extending along the length thereof, wherein the interior channel has at least one open end or two oppositely disposed open ends. When the channel has two open ends, one open end is located on and is accessible through the exterior free end of the clamp member adjacent or contiguous to the knob, grip, handle, etc. The opposite open end of the interior channel is disposed on the inner free end of the clamp member in communication with the open interior. Further, the interior channel is coaxially aligned with the length of the clamp member and defines a linear path of travel of the tool through the interior of the clamp member.

It should be recognized, that the accurate positioning of the device and/or doorstop in the intended portion of the door is dependent on the accurate disposition of the door portion in the aforementioned "operative position" within the open interior of the base. Accordingly, the open interior and corresponding portions of the base are further structured, dimensioned and configured to easily and efficiently dispose the door portion in the intended operative position. Therefore, the open interior and the base further includes a first open face and a second open face disposed in substantially opposing relation to one another, respectively on a front or leading side and on a rear or trailing side of the base. The first and second open faces are disposed in direct communication with the open interior and as such may be considered a part thereof. Further, the first, leading or frontal open face may have a larger overall dimension to facilitate the entering and/or passing of the door portion into the open interior. In cooperation there with, the rear or trailing second open face may have a somewhat smaller dimension than the first open face and is disposed and configured to receive and retain a "corner segment" of the portion of the door therein.

Moreover, the second open face is disposed, dimensioned and configured to receive and retain the corner segment of the door portion therein, subsequent to the remainder of the door portion passing into and through the first open face and being disposed in the operative position within the open interior. Such receipt and retention of the corner segment may be more specifically described as the corner segment at least partially passing through the open interior and being retained in an outwardly extended position through the second open face. The smaller size of the second open face, relative to the first open face, will prevent passage of the remainder of the door portion, other than the corner segment, through the second open face. As a result, once clamping relation with the clamp member has been accomplished, maintenance and retention of the door portion within the open interior in the aforementioned operative position is substantially assured.

As will be apparent from a detailed description of the one or more preferred embodiments of the jig assembly, the device and or doorstop intended to be connected to the portion of the door will be accurately mounted adjacent to a lower, preferably outer corner segment of the door portion. However, such placement may vary due, at least in part, to the versatility of the structural and operative features of the jig assembly.

Yet additional features of one or more preferred embodiments of the jig assembly of the present invention may include at least one bushing disposed within the interior channel of the clamp member by being passed through the interior free open end thereof. Further, the at least one bushing is structured to have an outer head portion extending outwardly from the interior channel and at least minimally outward from the extremity of the free inner end of the clamp member and open inner end of the channel of the clamp member. Therefore, when the clamp member is disposed in clamping relation to the portion of the door, disposed into the operative position within the open interior, the outer extremity of the bushing will be disposed in direct clamping engagement with the door portion.

In addition, the bushing includes a substantially tapered or outwardly flared inner surface configuration disposed contiguous to the open end of the bushing. This tapered or outwardly flared inner surface is disposed, configured and dimensioned to receive and at least partially guide the leading and of the tool/drill bit into the interior of the channel, as it exits the door portion 102. Yet another feature associated with the jig assembly and more specifically the bushing associated with the free inner end of the clamp member may include a stabilizing structure. As such, the stabilizing structure is integrally or fixedly connected to the first bushing so as to at least partially define a portion of the outer extremity thereof. Further the outer extremity of the bushing and therefore the stabilizing structure may be at least partially "sharpened". Therefore, the stabilizing structure may be disposed and configured to engage and at least partially penetrate or cut into the corresponding surface of the door portion maintained in the operative position within the open interior. Such penetration will occur upon a continuing forced rotation, or other intended manipulation, of the clamp member into the aforementioned clamped relation with the door portion. For the purpose of clarity, the term "sharpened" is intended to describe a configuration of at least a portion of the outer extremity of the first bushing/stabilizing structure, which facilitates a cutting, slicing or other type penetration thereof into the door portion. As should be apparent, such penetration will establish a stabilizing connection and therefore retain and "stabilize" the clamp member into the intended clamped relation with the door portion.

One or more additional preferred embodiments of the jig assembly of the present invention may also include a second bushing formed in at least one hole or opening in the second end segment. As such, the hole and second bushing are preferably disposed in coaxial alignment with the interior channel of the clamp member as well as the first bushing connected to and extending outwardly from the inner free end of the clamp member. Therefore, in a practical application of at least one preferred embodiment of the present invention, the tool or drill bit passes from an exterior of the jig assembly, through the second bushing disposed in the second end segment and into engagement with the door portion, concurrent to the door portion being disposed in the operative position within the open interior. Further, the tool or drill bit may pass completely through the door into the coaxially aligned first bushing and interior channel of the clamp member.

Also, when the interior channel includes two, oppositely disposed open ends, the tool and/or drill bit may pass completely through the clamp member along the interior channel and out through the exterior open and of the interior channel. Moreover, the clamp member having two oppositely disposed open ends of the interior channel, enables the tool and/or drill bit to travel in an opposite direction. More specifically, the drill bit may be disposed on the exterior of the base, pass into the exterior open end of the channel of the clamp member, out through the interior open end of the channel and into engaging relation with the door. Further, the tool and/or drill bit may pass through the door into the second bushing in the second end segment.

Additional features of one or both of the first and second bushings is their ability to protect the inner surface of the interior channel of the clamp member and/or the hole or opening formed in the second end segment. This will in turn result in an extended operable life of the jig assembly in that one or both of the bushings may be replaced after one or more uses and/or resulting damage done thereto by the rotating tool and/or drill bit as set forth above.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As represented in the accompanying drawings, the present invention is directed to a jig assembly generally indicated as 10. The jig assembly 10 includes a base 12 comprising two end segments 14 and 16 disposed on opposite sides of an open interior 18 of the base 12. The two end segments 14 and 16 are interconnected by at least one but preferably at least two arm or side segments 15 and 17. The versatility of the jig assembly 10, including the structuring of the base 12 is such as to independently receive and maintain any one of a plurality of differently sized doors, generally indicated as 100, at least partially within the open interior 18, in a preferred, predetermined "operative position". In order to accommodate doors 100 of different sizes, the space between the end segments 14 and 16 may be purposefully enlarged, thereby providing a dimension and configuration of the open interior 18 which accommodates doors of different sizes to be inserted therein.

Figure 5:
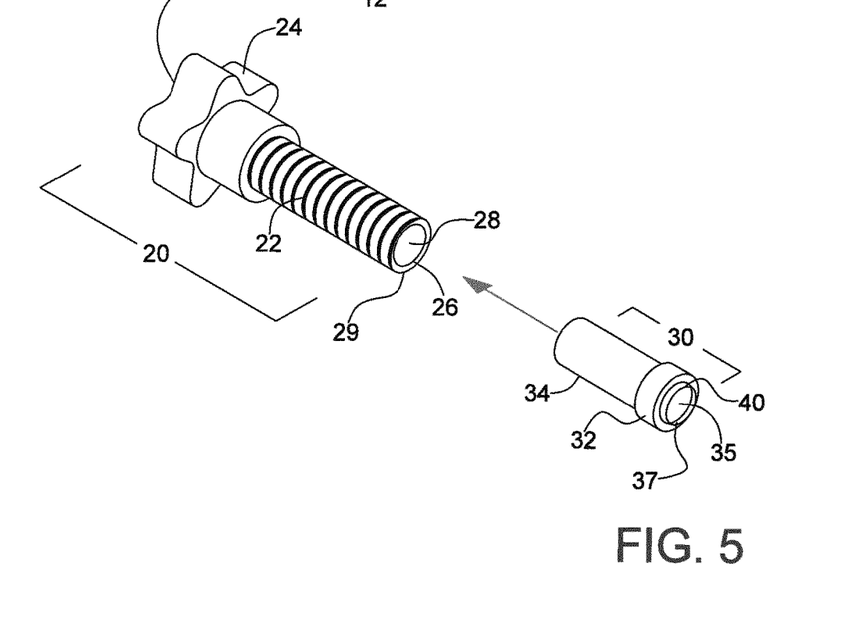
FIG. 5 is a perspective view in exploded form of a clamp member associated with the embodiments of the jig assembly as represented in FIGS. 1-4.

However, in order to removably maintain a given door 100 in the intended operative position, the jig assembly 10 further includes a clamp member generally indicated as 20 and represented in detail in FIG. 5. In the one or more embodiments represented in at least FIGS. 1-5, the clamp member 20 includes an elongated configuration having an exterior threaded surface 22. The clamp member 20 is movably connected to the base 12 by virtue of it extending through at least one hole or opening 25 formed in a first end segment 14. Due to the length of the clamp member 20 and its intended operation and use, the clamp member 20 is movably disposed both exteriorly of the base 12 and interiorly of the open interior 18. In addition, the clamp member 20 includes a knob, grip, handle, etc. 24 disposed on and at least partially defining the outer free end thereof and is fixedly connected thereto.

Accordingly, rotation of the knob, grip, etc., 24, through manual manipulation thereof, results in a forced rotation of the clamp member 20, due at least in part to the threaded, mating engagement of the externally threaded surface 22 with the internally threaded surface 25' of the hole or opening 25 formed in the first end segment 14. Such continued rotation, through manual manipulation, of the clamp member 20 will force the free inner end 26 thereof into a clamping relation to a door portion 102 disposed within the opening interior 18. Such a clamping relation between the clamp member 20 and the portion of the door 102 will serve to maintain the door portion 102 as well as the door 100 in the aforementioned operative position.

Figures 1, 2, 3:
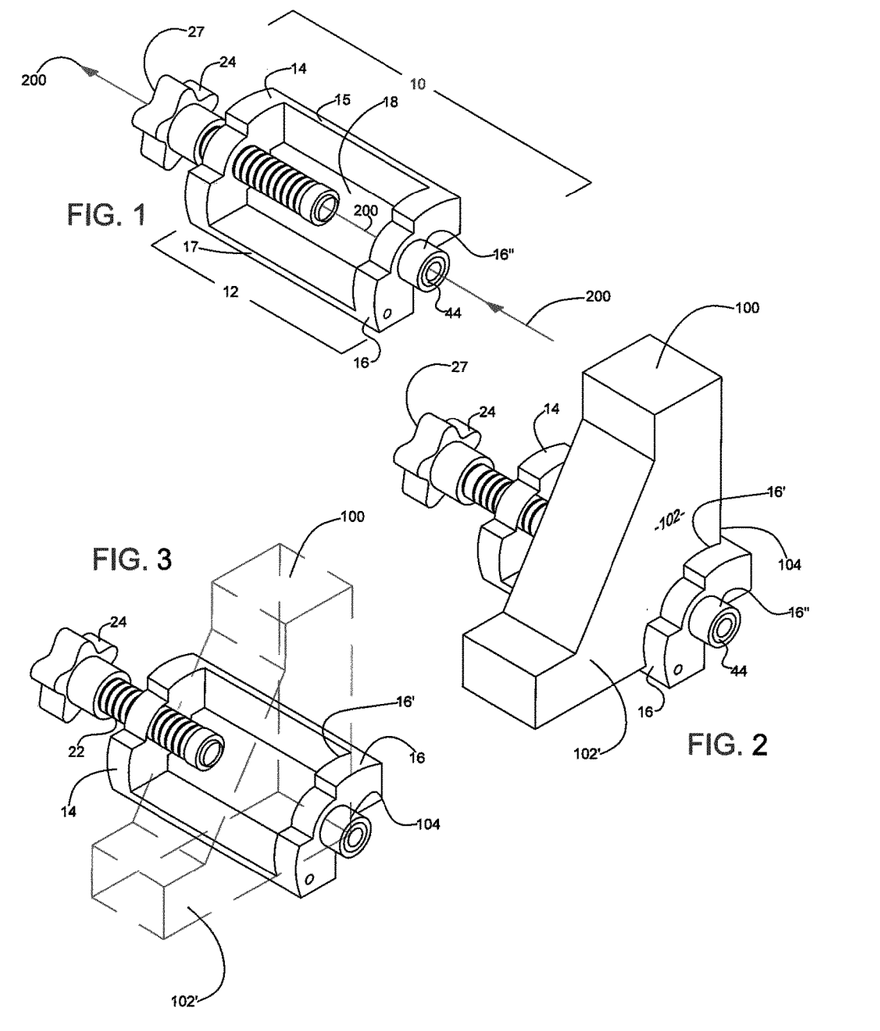
FIG. 1 is a perspective view of one preferred embodiment of the jig assembly for a door of the present invention.
FIG. 2 is a perspective view of the embodiment of FIG. 1 with a portion of a door in an operative position therein.
FIG. 3 is a perspective view in the Phantom of the embodiment of FIG. 2.
Figure 4:
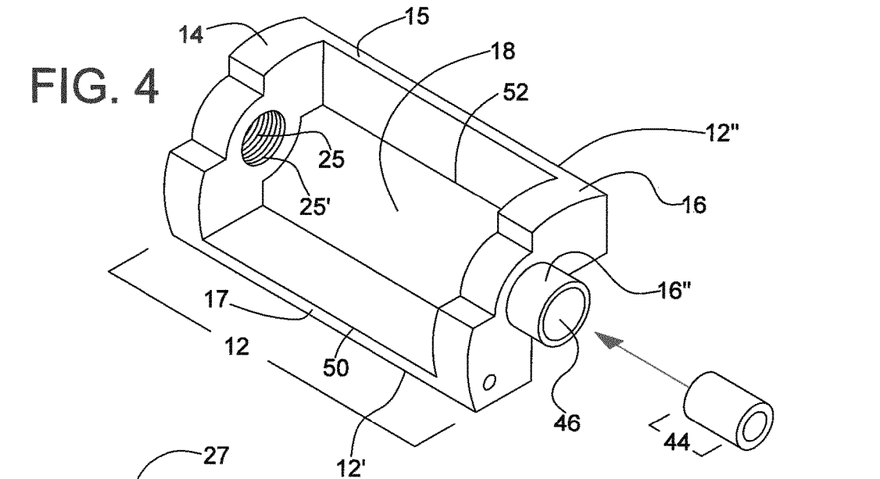
FIG. 4 is a perspective view in exploded form of a base of the embodiments of FIGS. 1-3.

The clamp member 20 also includes an interior channel 28 disposed therein and extending coaxially along the length thereof. The interior channel 28 may terminate in at least one inner open 29, formed on the free inner and 26 of the clamp member 20. Also, the channel 28 may include an oppositely disposed open end (not shown for purposes of clarity) disposed at the oppositely disposed outer free end of the clamp member 20 and on the interior of and coincident with the knob, grip, handle, etc. 24. One purpose of the interior channel 28 is to facilitate the accurate positioning of a tool through the clamp member 20 concurrent to the tool or drill bit being disposed within in and passing through the portion 102 of the door 100 maintained in the operative position within the open interior 18. In more specific detail and with reference to FIG. 1, directional arrows, schematically represented as 200, represents a path of the tool/drill bit, passing from an exterior of the base 12 through an opening 46 formed in an extension 16" of the second end segment 16. The tool/drill bit then passes successively through the door portion 102 in the operative position within the open interior 18 (see FIGS. 2 and 3). The tool/drill bit then passes successively into the interior channel 28 of the clamp member 20 and along at least a portion of the interior channel 28. As also represented in FIG. 1 when the open channel 28 has two oppositely disposed open ends, the tool/drill bit may pass completely there through, exiting the outer open and which is disposed coincident with the outer end 27 of the grip member 24.

Figure 6A:
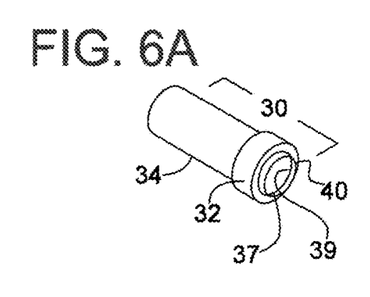
FIG. 6A is an exterior perspective view of a bushing which may be incorporated in the embodiments of FIGS. 1-5.
Figure 6B:
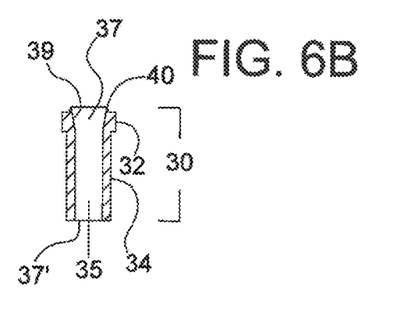
FIG. 6B is a longitudinal sectional view of the bushing as represented in FIG. 6A.
Figure 7A:
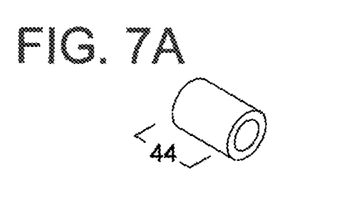
FIG. 7A is an exterior perspective view of another bushing which may be incorporated in the embodiments of FIGS. 1-5.
Figure 7B:
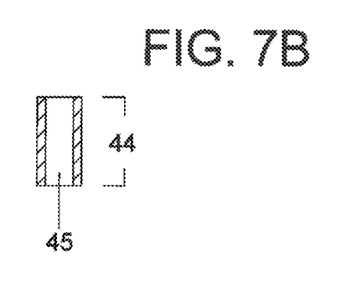
FIG. 7B is a longitudinal sectional view of the bushing as represented in FIG. 7A.

Yet additional features of one or more preferred embodiments of the jig assembly 10 of the present invention may include at least one bushing 30 disposed within the interior channel 28 of the clamp member 20 by being passed through the inner free end 26 of the clamp member and open inner end 29 of the interior channel 28. As represented in at least FIG. 6B, the at least one bushing 30 is structured to have an outer end or head portion 32 extending outwardly from the interior channel 28 and at least minimally outward from the free inner end 26 of the clamp member 20. A remaining portion 34 of the bushing 30 is fixedly connected to the head portion 32 and has a sufficiently reduced outer dimension to pass into the interior channel 28, such as through the open inner end 29. In contrast, the head portion 32 has an at least minimally larger exterior transverse dimension thereby maintaining disposition of the head portion 32 in outwardly extending relation from the free inner end 26 and open end 29 of the interior channel 28. In addition, the bushing 30 includes a substantially tapered or outwardly flared inner surface 39 contiguous to the open end 37. This tapered or outwardly flared inner surface 39 is disposed, configured and dimensioned to receive and at least partially guide the leading and of the tool/drill bit into the interior of the channel 28, as it exits the door portion 102.

Therefore, when the clamp member 20 and free inner end 26 is disposed in clamping relation to the portion of the door 102, the outer head portion 32 of the bushing 30 is disposed in clamping engagement with the door portion 102. As a result, the portion of the door 102 will be maintained or clamped in the aforementioned predetermined, operative position, represented in FIGS. 2 and 3 within the open interior 18. Moreover, as also represented in FIGS. 2 and 3, the operative position may be further defined by the outer surface 102' of the door portion 102 being clamped into engagement with an inner surface 16' of the second end segment 16.

Yet another feature associated with the jig assembly 10 and more specifically the first bushing 30 may include a stabilizing structure 40. As such, the stabilizing structure is integrally or fixedly connected to the head portion 32 of the first bushing 30 so as to at least partially define a portion of the outer extremity thereof. Further, in at least one preferred embodiment, the outer extremity of the bushing 30 and therefore the stabilizing structure 40 may be at least partially "sharpened". This sharpened configuration enables the stabilizing structure 40 to engage, penetrate and be connected to the corresponding surface of the door portion 102, when in the operative position within the open interior 18. Such penetration will occur upon a continuing forced rotation, or other intended manipulation, of the clamp member 20 into the aforementioned clamped relation with the door portion 102.

It is to be further noted that while the stabilizing structure 40 is represented as having a substantially continuous, circular or annular configuration, different configurations, structures, etc. thereof could be utilized to accomplish the penetration thereof into the door in order to establish a stabilizing connection of the clamp member 20, bushing 30 and stabilizing structure 40 with the door. In addition, the stabilizing structure, regardless of its penetrating configuration is located exteriorly of the channel 28, open end 29 and any tool passing through the clamp member 20 and open end 29.

For the purpose of clarity, the term "sharpened" is intended to describe a configuration of at least a portion of the outer extremity and stabilizing structure 40 of the first bushing 30, which facilitates a cutting, slicing, puncturing or other type penetration thereof into the door portion 102. As should be apparent, such penetration will serve to "stabilize" the clamp member 20 into the intended clamped relation with the door portion 102, by virtue of the penetration of the stabilizing structure 40 into the door portion 102 concurrent to the passing of the tool/drill bit through the door portion 102 and into and through the interior channel 28.

One or more additional preferred embodiments of the jig assembly 10 of the present invention may also include a second bushing 44, with an open, through interior 45. The bushing 44 may be removably disposed in at least one hole or opening 46 in the second end segment 16. As represented throughout the Figures, the second bushing 44 may be disposed in the opening 46 which is part of an extension 16" of the second end segment 16. Further, the hole 46 and second bushing 44 are preferably disposed in coaxial alignment with the interior channel 28 of the clamp member 20 as well as the interior 35 and open outer end 37 of the bushing 30 and or stabilizing structure 40.

Additional features of one or both of the first and second bushings 30 and 44 is their ability to protect the inner surface of the interior channel 28 of the clamp member 20 and/or the hole or opening 46 formed in the second end segment 16. This will in turn result in an extended operable life of the jig assembly 10 in that one or both of the bushings 30 and 44 may be replaced after one or more uses and/or resulting damage done thereto by the rotating tool and/or drill bit as set forth above.

As should be recognized, the accurate positioning of the device and/or doorstop in the intended portion 102 of the door 100 is dependent on the accurate disposition of the door portion 102 in the aforementioned "operative position". Accordingly, the open interior 18 and corresponding portions of the base 12 are further structured, dimensioned and configured to easily, efficiently and accurately dispose the door portion 102 in the intended operative position. Therefore, the open interior 18 and the base 12 further includes a first open face 50 and a second open face 52 disposed in substantially opposing relation to one another, respectively on a substantially front or leading side 12' and on a rear or trailing side 12" of the base 12. The first and second open faces 50 and 52 respectively are disposed in direct communication with the open interior 18 and as such may be considered as at least a part thereof.

Further, the first, leading or frontal open face 50 may have a larger overall dimension to facilitate the entry and/or passage of the door portion 102 into the open interior 18. In cooperation there with, the rear or trailing second open face 52 may have a somewhat smaller dimension than the first open face 50 and is disposed and configured to receive and retain a "corner segment" 104 of the portion of the door 102 therein, as represented in phantom lines and the solid lines respectively in FIGS. 3 and 2. Moreover, the second open face 52 is disposed, dimensioned and configured to receive and retain the corner segment 104, subsequent to the remainder of the door portion 102 passing into and through the first open face 50 and being disposed in the operative position within the open interior 18, as represented in at least FIGS. 2 and 3. Such receipt and retention of the corner segment 104 may be more specifically described as the corner segment 104 at least partially passing through and retained in an outwardly extended or projecting position, through the second open face 52 from the open interior 18. The smaller size of the second open face 52, relative to the first open face 50, will prevent passage of the remainder of the door portion 102, other than the corner segment 104, through the second open face 52. As a result, once a clamping relation with the clamp member 20 and/or clamping engagement with the stabilizing structure 40 has been accomplished, maintenance of the door portion 102 within the open interior 18, in the aforementioned operative position is substantially assured.

As will be apparent, from a review of FIGS. 2 and 3, one or more preferred embodiments of jig assembly 10, the device and or doorstop intended to be connected to the portion of the door 102 will be accurately mounted adjacent to a lower, preferably outer corner segment 104 of the door portion 102. However, such placement may vary due to the versatility of the structural and operative features of the jig assembly 10.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A jig assembly structured to facilitate attachment of a device to a door, said jig assembly comprising:
    a base including oppositely disposed end segments and an open interior, said base comprising a first side segment disposed at a perpendicular relationship with a second side segment, said perpendicular first and second side segments defining said open interior,
    said open interior at least partially disposed between said end segments and said perpendicular first and second side segments are configured to receive a corner portion of the door therein,
    a clamp member movably connected to a first of said end segments and at least partially disposable into said open interior in clamping relation to the door portion, and
    said clamp member including an interior channel dimensioned and disposed to receive passage therethrough of a tool concurrently disposed into engaging relation with the door portion.

2. The jig assembly as recited in claim 1 wherein said channel is coaxially aligned along a length of said clamp member and includes at least one open end, disposed within said open interior.

3. The jig assembly as recited in claim 2 wherein said channel includes oppositely disposed open ends, different ones of said open ends disposed exteriorly and interiorly of said open interior.

4. The jig assembly as recited in claim 2 wherein said clamp member, said channel and at least one open end are collectively disposed relative to said base to movably position the tool from an exterior to an interior of said open interior and into engagement with the door portion.

5. The jig assembly as recited in claim 1 wherein said first end segment comprises at least one opening structured to movably receive passage therethrough of said clamp member, from an exterior to an interior of said open interior.

6. The jig assembly as recited in claim 5 wherein a second of said end segments includes at least one opening disposed in aligned relation with said one opening of said first end segment.

7. The jig assembly as recited in claim 5 wherein a second of said end segments includes at least one opening disposed in aligned, receiving relation to the tool passing through said clamp member into said open interior.

8. The jig assembly as recited in claim 7 wherein said clamp member, said channel and said at least one opening in said second end segment are collectively disposed, relative to said base, to movably position the tool from an exterior to an interior of said open interior, through said second segment and into engagement with the door portion.

9. The jig assembly as recited in claim 1 further comprising a stabilizing structure connected to said clamp member and movable therewith into a stabilizing engagement with the door portion, concurrent to said clamping relation of said clamp member within said open interior.

10. The jig assembly as recited in claim 9 wherein said stabilizing structure comprises a sharpened configuration, said stabilizing engagement comprising said sharpened extremity disposed in at least partially penetrating relation to the door portion.

11. The jig assembly as recited in claim 9 wherein said stabilizing structure is disposed on an interior free end of said clamp member, exteriorly of said channel and exteriorly of the tool passing therethrough.

12. The jig assembly as recited in claim 9 further comprising at least a first bushing connected to and movable with said clamp member; said stabilizing structure mounted on said first bushing.

13. The jig assembly as recited in claim 12 wherein said first bushing is at least partially disposed within said interior channel; said stabilizing structure disposed exteriorly of said channel.

14. The jig assembly as recited in claim 12 further comprising at least a second bushing disposed on a second of said end segments in receiving relation to the tool passing through said second end segment.

15. The jig assembly as recited in claim 14 wherein said first and second bushings are respectively disposed in a protective relation to interior surfaces of said clamp member and said second end segment.

16. The jig assembly as recited in claim 1 wherein said base comprises a first open face and a second open face substantially oppositely disposed on said base in communicating relation with said open interior; said first and second open faces collectively structured for disposition of the door portion in an operative position within said open interior.

17. The jig assembly as recited in claim 16 wherein said second open face is dimensioned and configured to receive and retain therein a corner segment of the door portion, concurrently to a remainder of the door portion disposed in said operative position within said open interior.

18. A jig assembly structured to facilitate attachment of a device to a door, said jig assembly comprising:
    a base including oppositely disposed first and second end segments and an open interior; said open interior including a first open face and a second open face,
    said first and second open faces cooperatively disposed and structured with said first and second end segments to receive a corner portion of the door in an operative position within said open interior,
    said second open face dimensioned and configured to receive and retain said corner portion therein, concurrent to a remainder of the door portion disposed in said operative position within said open interior,
    a clamp member movably connected to said first end segment and at least partially disposable into said open interior in clamping relation to the door portion, and
    said clamp member including an interior channel dimensioned and disposed to receive passage therethrough of a tool concurrent engaging relation of the tool with the door portion.

19. The jig assembly as recited in claim 18 further comprising a first bushing and a second bushing respectively disposed on said clamp member and said second end segment in coaxially aligned relation to one another and said interior channel.

20. The jig assembly as recited in claim 19 wherein said clamp member, said channel and at least said second bushing are collectively disposed, relative to said base, to movably position the tool from an exterior to an interior of said open interior, through said second bushing, into engagement with the door portion and through said first bushing into said interior channel of said clamp member.

21. The jig assembly as recited in claim 20 wherein said first bushing comprises a tapered interior surface disposed in receiving relation to the tool passing into said interior channel from the door portion.

\* \* \* \* \*